United States Patent
Lockhart et al.

(10) Patent No.: US 6,230,272 B1
(45) Date of Patent: *May 8, 2001

(54) SYSTEM AND METHOD FOR PROTECTING A MULTIPURPOSE DATA STRING USED FOR BOTH DECRYPTING DATA AND FOR AUTHENTICATING A USER

(75) Inventors: Roland T. Lockhart, Kanata; Michael J. Wiener, Nepean, both of (CA)

(73) Assignee: Entrust Technologies Limited, Ottawa (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,744

(22) Filed: Oct. 14, 1997

(51) Int. Cl.$^7$ .................................................. H04K 1/00
(52) U.S. Cl. ................................................ 713/202
(58) Field of Search .................... 380/4, 21, 30, 380/28, 258, 259, 255, 262; 705/41, 65, 67; 713/202, 200

(56) References Cited

U.S. PATENT DOCUMENTS

| | | | |
|---|---|---|---|
| 4,817,140 | * | 3/1989 | Chandra et al. .......................... 380/4 |
| 5,406,624 | * | 4/1995 | Tulpan ..................................... 380/4 |
| 5,636,280 | * | 6/1997 | Kelly ....................................... 380/21 |
| 5,649,118 | * | 7/1997 | Carlisle et al. ......................... 705/41 |
| 5,778,072 | * | 7/1998 | Samar ..................................... 380/30 |
| 5,887,131 | * | 3/1999 | Angelo ................................. 713/202 |

* cited by examiner

Primary Examiner—Tod Swann
Assistant Examiner—Matthew Smithers
(74) Attorney, Agent, or Firm—Markison & Reckamp, P.C.

(57) ABSTRACT

A method and system for protecting a multipurpose data string used for both decrypting data and for authenticating a user utilizes a remote storage element that contains a long random data string or password protected by a short easy to remember access data, such as a personal identification number or other user authentication mechanism. The remote storage element contains data used for both initially encrypting secret private keys and for later decrypting the encrypted secret private keys, or other secret data, so they can be used to decrypt data transferred within a computer network, or be used for digitally signing data transferred within a computer network.

23 Claims, 4 Drawing Sheets

SYSTEM AND METHOD FOR PROTECTING A MULTIPURPOSE DATA STRING USED FOR BOTH DECRYPTING DATA AND FOR AUTHENTICATING A USER

BACKGROUND OF THE INVENTION

The invention relates generally to computer security systems using hardware tokens and more particularly to systems and methods for protecting information used for decrypting data transferred within a computer system.

Secure computer systems are known which use cryptographic techniques to encrypt and decrypt data sent from one computer or user to another computer within a network. In typical public key cryptographic systems, digital signature key pairs, such as a signature private key and a verification public key, are used to authenticate a digital signature of a client to ensure that a message sent by client actually came from the client sending the message and has not been altered. Generally, data is digitally signed by a sender using the signature private key and authenticated by a recipient using the verification public key. In addition to digital signature key pairs, encryption key pairs are also generally used to encrypt the data being sent from one client to another client. An encryption key pair typically includes a decryption private key and an encryption public key. Data is encrypted using the encryption public key and decrypted by a recipient using the decryption private key. Certificates are generated by a manager or trusted certification authority for the public keys of the private/public key pair to certify that the keys are authentic and valid.

The private keys must be securely maintained to avoid loss of security in the system. Hence some systems use a user password or data string, to encrypt the decryption private key and/or the signature private key while they are not being used or when archived. For example, an operator may be asked to select a password which is then typed into a computer system upon initialization. The computer system applies a one way function or hash process on the password to generate a symmetric encryption key, referred to as passkeys. The symmetric encryption key is used to initially encrypt the decryption private key and the digital signature private key or other sensitive data. This encrypted information may be stored as an operator profile file within the secure system. During normal operation, the previously encrypted decryption private key and/or encrypted digital signature private keys are subsequently decrypted by regenerating the symmetric key using the password. The decrypted private keys are then used to decrypt data and/or digitally sign encrypted data.

In addition, the hash process may generate an integrity key which applies an integrity value to the private key to verify the encrypted private key is authentic thereby indicating proper integrity. The password, or other data string, is used as a multipurpose data string in that the information is used both to encrypt a private key upon initialization and subsequently used to decrypt the encrypted private key when the private key is to be used to decrypt data to be sent within the system or to sign data sent in the system. In addition, the data string is used to authenticate a user since that password is unique to a given computer or individual. A problem arises in maintaining a proper level of security with user-defined passwords because the data strings used to initially encrypt the private keys should be random and of a suitable length to prevent a comprise in security by a unscrupulous hacker. When users are asked to create their own password or data string and enter it on a keyboard, the system is at risk by allowing the keyboard to be viewed by another person during the password entry process which may occur on every user login. Conventional password keyboard entry systems can also limit the randomness and length of the passwords since an operator may not readily remember a long random password or data string.

Attempts have been made to facilitate improved security through the use of hardware tokens which may be a storage and processing element such as a plastic key containing a RAM chip and microprocessor that may contain a user's private keys and/or certificates. Such hardware tokens typically perform all of the cryptographic operations such as decrypting received data and signing data with a private key. In this way, the private keys are not stored on the system and available for possible detection by a hacker. Although useful in protecting secret information, systems utilizing such sophisticated hardware tokens that contain processing capabilities are often quite costly for large secure cryptographic systems.

Other conventional hardware token systems that use a remote storage element or processing unit typically store information that only authenticates a given user, namely a personal identification number, which identifies the storage element holder as the user. Data used for initially encrypting highly sensitive data such as private keys and later decrypting the private keys for use in public key cryptography systems is typically not stored on such hardware token devices.

Moreover, where a password needs to be entered for each software application being used on the system, the repeated entry of the same password, or the maintenance of multiple passwords which should be significantly random and of suitable length, is a difficult task for many operators. Other known hardware token mechanisms contain a stored personal identification number along with a stored password and require a user to enter the personal identification number through a keyboard or other mechanism whereafter, if the stored PIN matches the entered pin, the password is released to a host system such as a computer terminal. However, the data string does not generally contain data used for additionally securing private keys. Also, these systems are often more costly since they require the capability of comparing PIN numbers and releasing passwords so that if a device was stolen, the thief could obtain the PIN from the token and enter the PIN in a system to gain access to the system.

Consequently there exists a need for a system and method for protecting a multipurpose data string used for both decrypting data and for authenticating the user, that provides a suitable length and random data string that is not readily detected upon use. Moreover, it would be advantageous if such a system and method was of low cost and would not readily operate if the remote storage element were lost or unscrupulously obtained by an unauthorized operator.

BRIEF DESCRIPTION OF THE DRAWINGS

The features of the present invention together with the advantages thereof, may be understood by reference to the following description taken in conjunction with the accompanying drawings wherein.

DETAILED DESCRIPTION OF THE INVENTION

The disclosed method and system for protecting a multipurpose data string used for both decrypting data, such as encrypted decryption private keys, and for authenticating a user utilizes a remote storage element, such as a hardware token, that contains a long random data string, or password, protected by short easy to remember access data, such as a personal identification number or other user authentication mechanism. The system and method offers a low cost two factor authentication scheme, namely a short PIN and a remote storage element that contains data used for both initially encrypting secret private keys, such as a decryption private key and a digital signature private key, and for later decrypting the encrypted secret private keys, or other secret data, so they can be used to decrypt data transferred within a computer network, or be used for digitally signing data transferred within a secure computer network.

Preferably, the system includes a remote storage element programmer and reader connected to a computer that is operated under software control to request an operator to enter a long random multipurpose data string once, or alternatively, automatically generates the random data string for the operator. The computer controls the storage element programmer to program the multipurpose data string onto the remote storage element. The system uses the multipurpose data string to decrypt private cryptographic keys, preferably using symmetric key passwords based on the multipurpose data string, after the private cryptographic keys have been encrypted based on the multipurpose data string. The encrypted cryptographic keys (e.g., private keys or other secret non-key information) and other user information is stored on another storage unit accessible by the computer.

The system determines the passkey, or symmetric key, for decrypting an encrypted decryption key, such as a decryption private key, in response to transferring the stored data string from the remote storage element. If desired, the multipurpose data string stored on the remote storage element is also used to determine an integrity passkey generated by the computer that is used to compute an integrity value of the private key. The remote storage element may be a smart card, a biometric unit such as a fingerprint reading device or other suitable storage element with operator or user identification capabilities. The computer receives a personal identification number or other suitable authentication data for use in determining whether the multipurpose data string received from the remote storage element is designated for a particular operator or computer.

Figure 1:
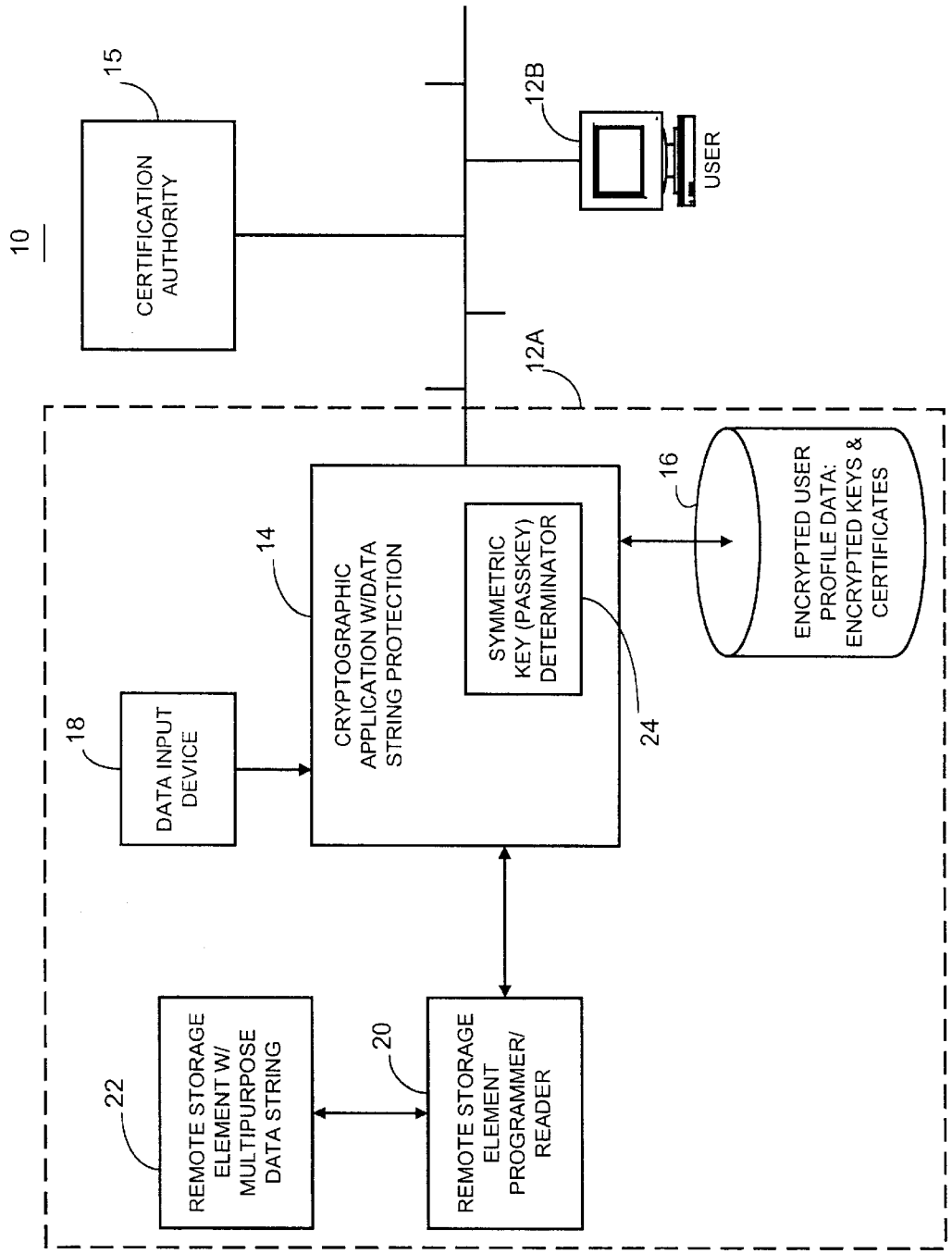
FIG. 1 is a block diagram of a computer network system incorporating one embodiment of a system and method for protecting a multipurpose data string in accordance with the invention.

FIG. 1 shows one example of a public key/private key cryptographic system 10 embodying one example of the invention. The public key/private key cryptographic system 10 contains a computer system 12a and 12b that may be networked to a certification authority 15 for facilitating secure communication using decryption private keys and digital signature private keys to facilitate the transfer of information within the network. The network can be a global network, such as the Internet, a local network or other suitable communication system. The certification authority 15, as known in the art, certifies that specific public keys are associated with a given user and certifies the information in a certificate. The certificate is typically sent with each communication and it is used by a recipient of the communication to authenticate that the information was sent by a valid participant in the system.

By way of example, the computer system 12a includes a software program 14, such as a cryptographic application with password protection capabilities, for controlling a central processing unit (not shown) to carry out specified functions to facilitate protection of the multipurpose data string as described herein. The computer system 12a includes storage element 16, such as a database containing encrypted user profile data (encrypted at initialization), such as encrypted private keys and certificates for use by a user 12a to communicate with other computers within the network. The computer 12a also includes a data input device 18, such as a keyboard, or graphical user interface for entering among other things, authentication data, such as a personal identification number. The computer system 12a also includes a remote storage element programmer/reader 20 to facilitate the storing of a multipurpose data string on a remote storage element 22. The remote storage programmer/reader 20 is preferably controlled by the computer 12a under control of cryptographic program 14 to read the multipurpose data string from the remote storage element on demand. However, it will be recognized that storage of the multipurpose data string may be performed by a system other that the computer system 12a.

The remote storage element programmer/reader 20 and remote storage element 22 may be biometric data storage programming and reading systems such as a fingerprint detector with associated memory wherein the multipurpose data string is not released to the computer 12a unless a valid fingerprint is read by the programmer/reader. Also the remote storage element may be a smart card and the remote storage element programmer/reader 20 may be a smart card programmer and reading system.

Under control of software program 14, the computer 12a requests the multipurpose data string from the remote storage element 22 for transfer to memory (e.g., RAM) in the computer where it is used for encrypting or decrypting private key information wherein the private key information is used to decrypt data, perform digital signatures, or other suitable process. The computer 12a under software control determines a symmetric key, or passkey for decrypting an encrypted decryption key. It is temporarily stored in computer memory in response to it transferring the stored multipurpose data string from the remote storage element. To perform this operation of determining a passkey, the program 14 includes a software module for performing symmetric passkey determination as known in the art, indicated at 24. For example, symmetric determination may be performed based on public key cryptography standard (PKCS) No. 5 (available from RSA Data Security Inc., Redwood City, Calif. 94065).

Figure 2:
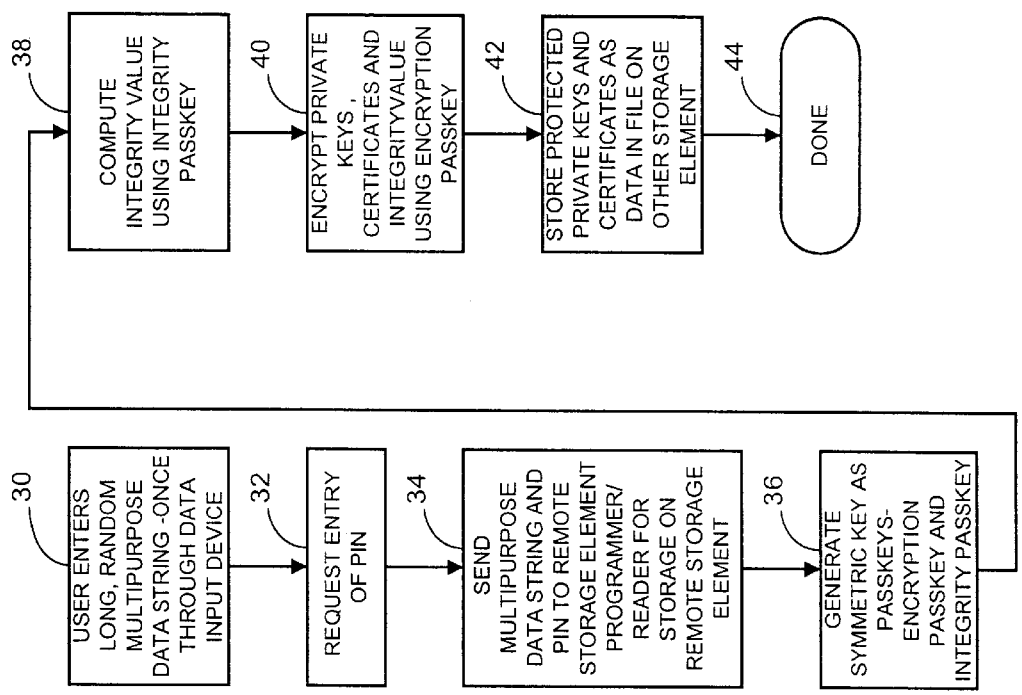
FIG. 2 is a flowchart generally showing a method for initially setting up the system of FIG. 1.

As shown in FIG. 2, during a first time initialization of user a profile, under control of cryptographic program 14, the computer 12a requests an operator to enter a long random multipurpose data string once, using the data input device 18, which may be a graphical user interface or keyboard. Preferably, the data string is a 64 bit or higher random data string. The computer 14 receives the multipurpose data string and temporarily stores it. This is shown in block 30. As shown in block 32, the computer 12a requests entry of user authentication data such as a biometric or personal identification number (PIN) as further security through the data input device 18 or remote storage element programmer/reader 20. The computer 12a receives this user authentication data and associates the user authentication data with the entered multipurpose data string.

The computer 12a then communicates a command signal to the remote storage element programmer/reader 20 to store the multipurpose data string on the remote storage element 22. In addition the user authentication data is also stored on the remote storage element. This is shown in block 34. It will be recognized that a derivation of the authentication data may instead be stored for further security.

During initialization, the computer 12a under control of the cryptographic program 14 generates a pair of symmetric keys, such as passkeys, using the multipurpose data string as a source or seed. The computer 12a first generates an encryption passkey and an integrity passkey by passing the multipurpose data string through a one way function or hash process, as known in the art. This is shown in block 36. The computer 12a computes an integrity value using the integrity passkey, as shown in block 38. The integrity value may be computed for example using message authentication codes such as described in Federal Information Processing Standards Publication 113 (FIPS PUB. 113). In addition, the computer 12a through the cryptographic application 14 encrypts a private key stored in the database 16 and encrypts the integrity value using the encryption passkey as shown in block 40. The computer 12a through cryptographic application 14 writes the encrypted private keys, integrity value and certificates, if encrypted, and stores the information as user profile data in a file in the database 16. This is shown in block 42. As indicated in block 44, the process is complete unless a user wishes to use a different data string for another software application that is used on the computer 12a. It will be recognized by those of ordinary skill in the art, that the above identified steps may be changed in order to facilitate programming requirements. For example, steps 40 and 38 may be interchanged if desired.

The cryptographic information stored in database 16 includes a decryption private key that has been encrypted based on the multipurpose data string, a digital signature private key which has been encrypted based on the multipurpose data string, and various certificates, such as a user signing certificate, an encryption certificate and a certification authority certificate for that user. Hence the computer 12a under control of program 14 encrypts the decryption private key based on the multipurpose data string and stores the encrypted decryption private key in database 16. After the initialization process, the computer 12a subsequently verifies the user authentication data, such as the PIN entered through data input device 18, prior to transferring the stored multipurpose data string from the remote storage element. In this way, even if the remote storage element were obtained by an improper or unauthorized operator, it could not be used by itself to gain access to the cryptographic keys that are encrypted stored in database 16, since a authentication data must also be entered.

If desired, after the private keys have been protected through encryption based on the multipurpose data string, the computer 12a may also store data that identifies a storage location on the other storage element (database 16) containing a user's encrypted decryption private key, the encrypted private signature key and associated certificates. In this way, when the computer 12a through cryptographic application 14 obtains proper authentication and is able to later obtain the multipurpose data string, the computer may determine where the associated encrypted cryptographic keys are located within the database 16. It will be recognized with those of ordinary skill in the art, that database 16 may be a remote database or onboard database in memory or any other suitable storage element accessible by computer 12a.

Also if desired, the remote storage element may contain stored passkeys, however, this may increase the cost of the remote storage element since storage of two passkeys is preferably required and this can require more memory than the PIN and the multipurpose data string.

Figure 3:
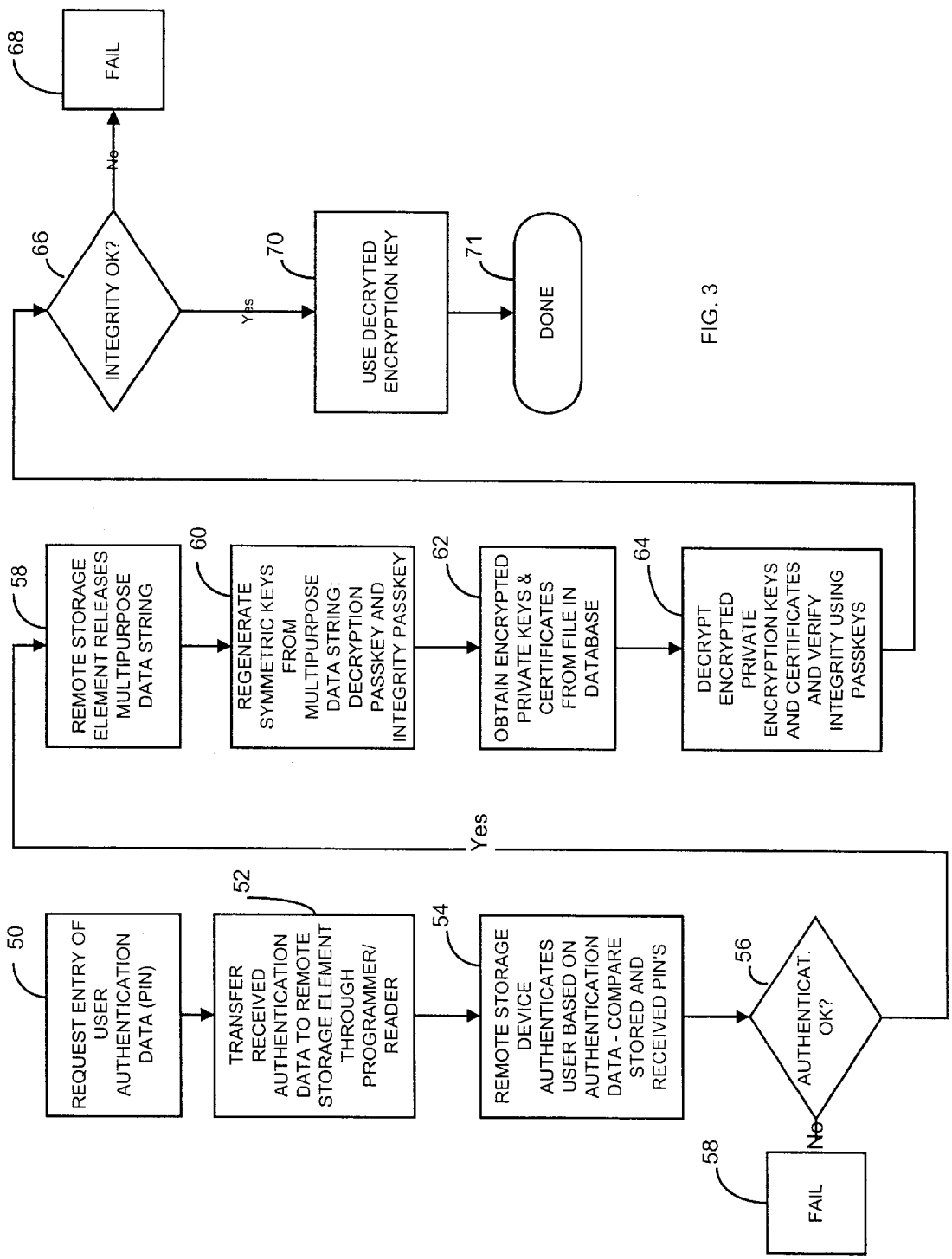
FIG. 3 is a flow diagram generally depicting one embodiment of the operation of the system of FIG. 1.

FIG. 3 shows the operation of the system of FIG. 1 after the initialization procedure previously described has been completed. The below operation may be performed for example upon each login by an operator on a user computer 12a. As shown in block 50, the computer 12a, or client in a trusted security network system, requests entry of the user authentication data through the data input device 18. The computer 12a under program control, transfers the authentication data to the remote storage element through remote storage element programmer/reader 20 as shown in block 52. The remote storage element with multipurpose data 22 authenticates the user based on the user authentication data, such as the personal identification number, by comparing the transferred PIN to the PIN stored on the remote storage element. Consequently the remote storage element is preferably a smart card which has the suitable logic for comparing a stored authentication data to transferred identification data. This is shown in block 54. If the remote storage element with multipurpose data string 22 does not approve authorization, the multipurpose data string is not transferred from the remote storage element and the cryptographic application 14 prevents further access by the user and notifies an operator that access has been denied as shown in blocks 56 and 58.

If the remote storage element with multipurpose data string 22 authenticates the user 12a, the remote storage element with multipurpose data string 22 releases the stored data string through the cryptographic application 14 as shown in block 58. The cryptographic application 14 then regenerates the symmetric key pair based on the data string as shown in block 60. The regenerated symmetric key pair includes, for example, a decryption passkey and an integrity passkey. Using the regenerated symmetric keys based on the multipurpose data string, the cryptographic application 14 accesses the encrypted user profile data, namely the encrypted decryption private key and signature private keys and certificates in database 16, and obtains the encrypted secret information from the database as shown in block 62.

By reversing the initialization encryption process, the cryptographic application 14 decrypts the encrypted private keys and certificates using the symmetric keys that were based on the multipurpose data string and checks the integrity using the integrity passkey as shown in block 64. If the computer 12a under the control of the cryptographic application 14 determines that integrity is not proper, an operator is notified by the cryptographic application as shown in blocks 66 and 68. If however, integrity is proper, the computer 12a uses the decrypted private keys and certificates for cryptographic based communication with other computers 12b or clients in the network as shown in block 68. Normal operation may then continue until another login is desired as shown in block 70. Hence the computer 12a under software control generates a symmetric key from the multipurpose data string and uses the symmetric key to decrypt encrypted private keys stored in a user profile on database 16. As indicated with respect to blocks 58 and 60, the computer 12a under control of the cryptographic application determines an integrity passkey in response to transferring the stored data string from the remote storage element 22.

Figure 4:
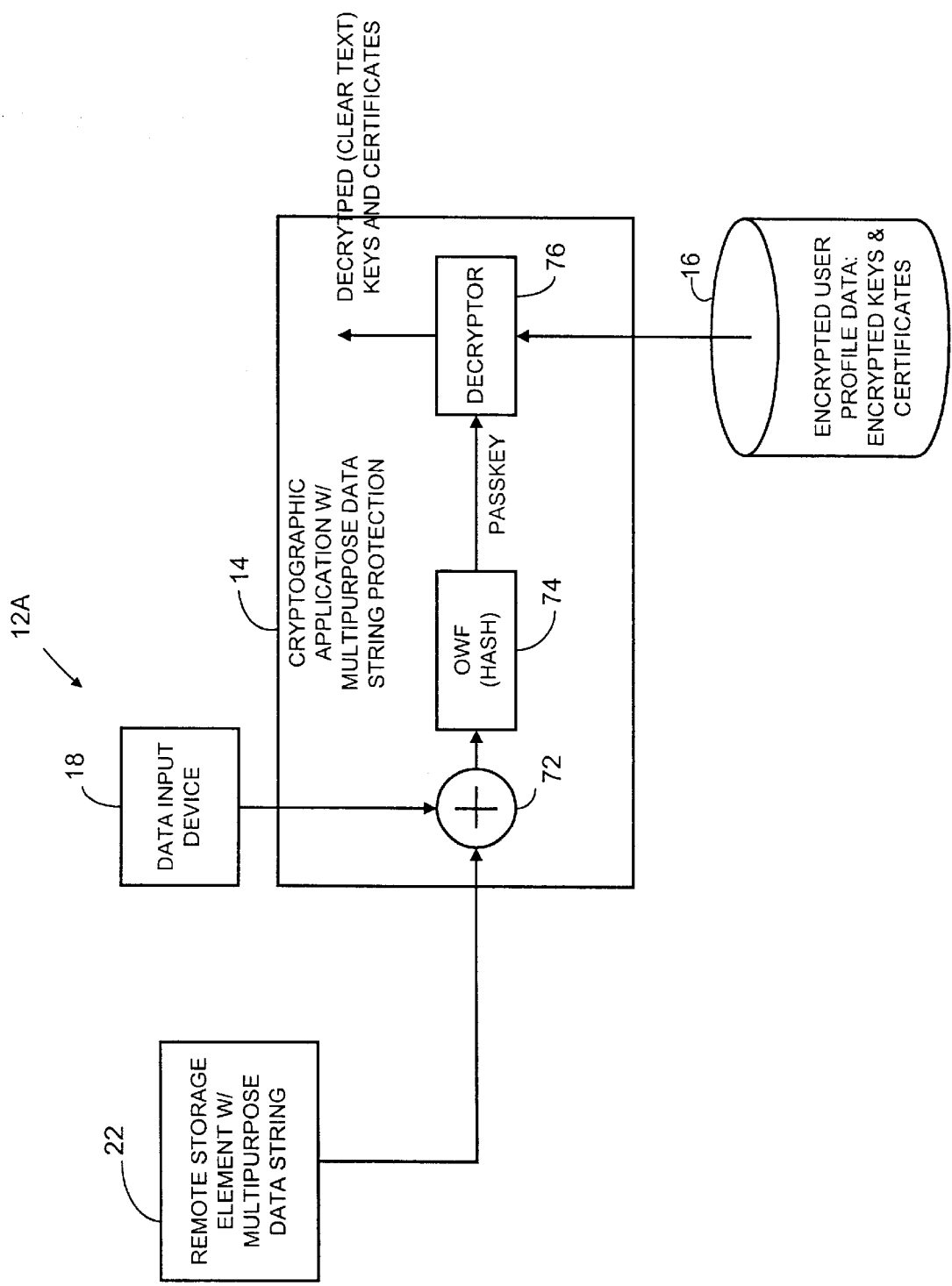
FIG. 4 is an alternative embodiment of the system shown in FIG. 1.

FIG. 4 shows an alternative embodiment of a system for protecting a multipurpose data string used for both decrypting data and for authenticating a user which performs the similar functions as previously described with respect to FIGS. 1–3, except that the PIN is not stored on the remote storage element with the multipurpose data string 22 and instead is entered or transferred to the computer 12a through cryptographic application 14 and is mixed or otherwise combined with the multipurpose data string stored on the remote storage element 22, thereby producing another level of security. The combined multipurpose data string and authentication data is then passed through a one way function or hash process 74 to generate the requisite passkeys. The system then uses those passkeys as previously described in a decryptor stage 76 to decrypt the encrypted private keys and certificates from the database 16 during normal operation. The multipurpose data string and authentication data is combined in a mixing block 72 which may perform an exclusive OR function, or may simply add the multipurpose data string with the personal identification data. The mixing block may also perform a hash function or other suitable combination in order to produce a data string that embodies additional authentication information, which combination is then used to initially encrypt decryption keys to secure those keys from undesired detection and subsequently used to decrypt the encrypted decryption keys for use during normal operation. Hence the computer 12a receives the multipurpose data string from the remote storage element 22 and also receives user authentication data associated with a user 12a or operator if desired, and combines the multipurpose data string with the authentication data to generate data for use in generating the passkeys for decrypting the encrypted decryption keys.

It should be understood that the implementation of other variations and modifications of the invention in its various aspects will be apparent to those of ordinary skill in the art, and that the invention is not limited by the specific embodiments described. For example, the system is not limited to protecting private keys but may be used to protect any suitable type of secret data. It is therefore contemplated to cover by the present invention, any and all modifications, variations, or equivalents that fall within the spirit and scope of the basic underlying principles disclosed and claimed herein.

What is claimed is:

1. A method for protecting a multipurpose data string used for both decrypting data and for authenticating a user, comprising the steps of:
    requesting the multipurpose data string from a remote storage element, that also stores user authentication data without storing a private key, for transfer to another storage element; and
    determining at least a passkey for decrypting encrypted data, based on the multipurpose data string, in response to transferring the stored data string from the remote storage element.

2. The method of claim 1 including the step of storing the multipurpose data string on the remote storage element to facilitate secure storage of the multipurpose data string.

3. The method of claim 1 further including the steps of accepting user authentication data and authenticating a user based on the user authentication data prior to allowing release of the multipurpose data string from the remote storage element to facilitate secure storage of the multipurpose data string.

4. The method of claim 2 including the step of automatically generating the multipurpose data string based at least in part on a random data generation scheme.

5. The method of claim 2 wherein the step of storing the multipurpose data string on the remote storage element includes storing data that identifies a storage location of at least a user's decryption key on the other storage element.

6. The method of claim 5 wherein the step of storing the multipurpose data string on the remote storage element includes storing data that identifies a storage location of at least a user's private signature key and associated certificate on the other storage element.

7. The method of claim 1 wherein the encrypted data is an encrypted decryption key.

8. The method of claim 1 further including the step of determining an integrity passkey in response to transferring the stored data string from the remote storage element.

9. The method of claim 1 further including the step of programming the remote storage element with the multipurpose data string.

10. The method of claim 1 wherein the step of determining includes generating a symmetric key from the multipurpose data string and using the symmetric key to decrypt a user profile containing encrypted private keys.

11. The method of claim 1 further including the steps of:
    receiving the multipurpose data string from the remote storage element;
    receiving user authentication data associated with the user; and
    operatively combining the multipurpose data string with the user authentication data to generate data for use in generating the passkey for decrypting the encrypted data.

12. The method of claim 1 further including the steps of:
    receiving the multipurpose data string;
    receiving user authentication data and associating the user authentication data with the multipurpose data string;
    storing the multipurpose data string on the remote storage element;
    generating the encrypted data based on the multipurpose data string;
    storing the encrypted data; and
    subsequently verifying user authentication data prior to transferring the stored multipurpose data string from the remote storage element.

13. A system for protecting a multipurpose data string used for both decrypting data and for authenticating a user, comprising:
    means for requesting the multipurpose data string from a remote storage element, that also stores user authentication data without storing a private key, for transfer to another storage element; and
    means, operatively coupled to the requesting means, for determining at least a passkey for decrypting encrypted data based on the multipurpose data string in response to transferring the stored multipurpose data string from the remote storage element.

14. The system of claim 13 wherein the encrypted data is an encrypted decryption key and the remote storage element is means for storing the multipurpose data string to facilitate secure storage of the multipurpose data string.

15. The system of claim 13 further including means for accepting user authentication data and for authenticating the user based on the user authentication data prior to allowing release of the multipurpose data string from the remote storage element means to facilitate secure storage of the multipurpose data string.

16. The system of claim 14 including means for automatically generating the multipurpose data string based at least in part on a random data generation scheme, prior to storage on the remote storage element means.

17. The system of claim 14 wherein the remote means for storing the multipurpose data string also stores data that identifies a storage location of at least a user's decryption private key on the other storage element.

18. The system of claim 17 wherein the remote means for storing the multipurpose data string stores data that identifies a storage location of at least the user's private signature key and associated certificate on the other storage element.

19. The system of claim 13 including means for determining an integrity passkey in response to transferring the stored data string from the remote storage element.

20. The system of claim 13 including means for programming the remote storage device with the multipurpose data string.

21. The system of claim 13 wherein the means for determining includes means for generating a symmetric key from the multipurpose data string and for using the symmetric key to decrypt a user profile containing encrypted private keys.

22. The system of claim 14 further including:
means for receiving the multipurpose data from the remote storage element;
means for receiving user authentication data associated with the user; and
means, operatively coupled to the means for receiving the multipurpose data string and the user authentication data, for combining the multipurpose data string with the user authentication data to generate data for use in generating the passkey for decrypting the encrypted decryption key.

23. The system of claim 14 further including:
means for receiving the multipurpose data string;
means for receiving user authentication data and associating the user authentication data with the multipurpose data string;
means, operatively coupled to the means for receiving the multipurpose data string and the means for receiving the user access identification string, for storing the multipurpose data string on the remote storage element;
means for generating the encrypted decryption key based on the received multipurpose data string;
means, operatively coupled to the means for generating the encrypted decryption key, for storing the encrypted decryption key; and
means, operatively coupled to the means for receiving the user authentication data, for subsequently verifying user authentication data prior to transferring the stored multipurpose data string from the remote storage element.

* * * * *